No. 747,982. PATENTED DEC. 29, 1903.
J. E. KORDICK & E. SULGROVE.
VALVE.
APPLICATION FILED SEPT. 5, 1903.
NO MODEL.
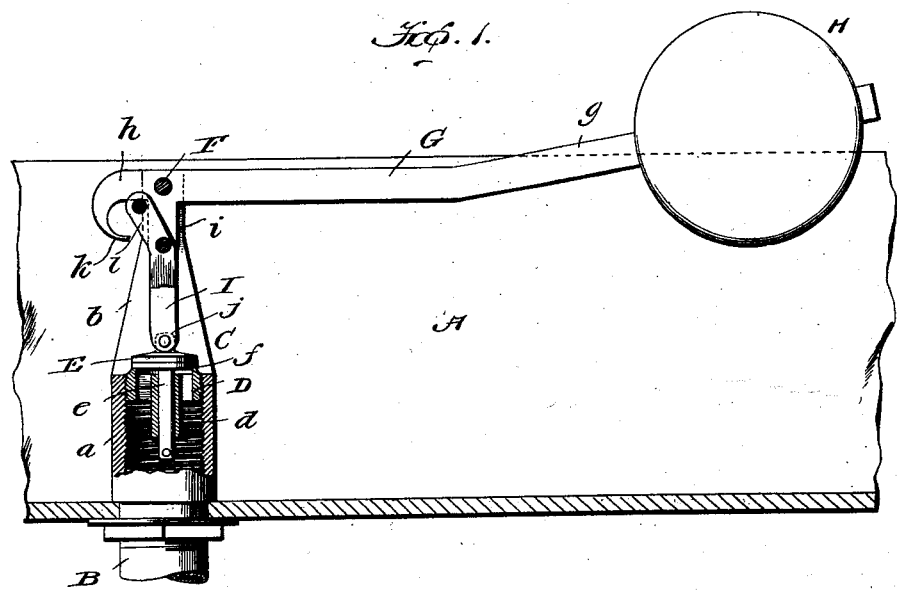
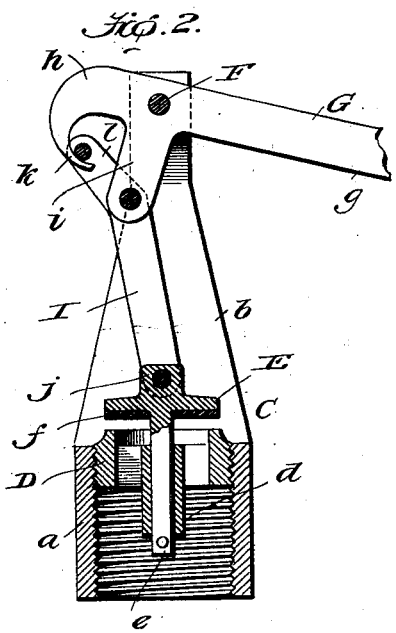
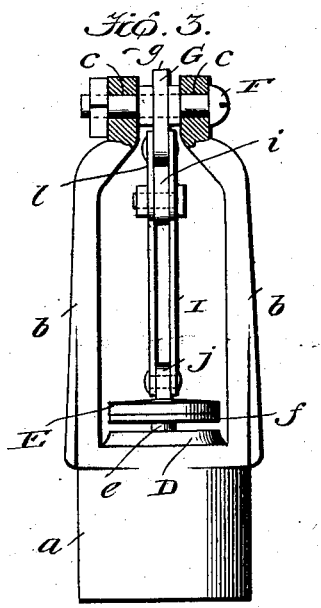
Witnesses
Inventors
J. E. Kordick + E. Sulgrove
by James J. Shuby
Attorney No. 747,982. Patented December 29, 1903.

UNITED STATES PATENT OFFICE.

JOHN EDWARD KORDICK AND EDWARD SULGROVE, OF BRIDGEWATER, IOWA.

VALVE.

SPECIFICATION forming part of Letters Patent No. 747,982, dated December 29, 1903.

Application filed September 5, 1903. Serial No. 172,084. (No model.)

*To all whom it may concern:*

Be it known that we, JOHN EDWARD KORDICK and EDWARD SULGROVE, citizens of the United States, residing at Bridgewater, in the county of Adair and State of Iowa, have invented new and useful Improvements in Valves, of which the following is a specification.

My invention pertains to valves, more particularly float-valves; and it consists in the novel and advantageous construction hereinafter described, and particularly pointed out in the claims appended.

In the accompanying drawings, forming part of this specification, Figure 1 is a view, partly in elevation and partly in vertical section, illustrating the valve constituting the preferred embodiment of our invention as closed. Fig. 2 is an enlarged detail view, partly in elevation and partly in section, with the valve open; and Fig. 3 is a view, partly in elevation and partly in section, taken at right angles to Fig. 2.

A is a tank, B a pipe leading from a source of water-supply and into the tank, and C the main frame of my improved valve. The said frame is preferably formed of one piece and comprises a tubular portion $a$ interiorly threaded to receive the complementary threaded end of the pipe B and standards $b$, extending upwardly from the tubular portion and having alined transverse apertures $c$ adjacent to their upper ends.

D is an exteriorly-threaded valve-seat adjustable in the tubular portion $a$ of the frame C in the direction of the length thereof and carrying an integral central guide $d$. The said valve-seat is adjustable, as stated, in order that the valve may be made to close tight or loose, as desired, and to permit of wear being taken up.

E is a reciprocatory valve having a stem $e$ disposed in the guide $d$ and also having rubber or other suitable packing $f$ at its under side; F, a transverse bolt secured in the apertures $c$ of the frame-standards $b$; G, a lever fulcrumed on the said bolt and having a long arm $g$ and a short arm $h$ and also having a short depending stem $i$ disposed below its fulcrum; H, a float suitably connected and movable with the long arm of the lever, and I a link connecting the stem $i$ of the lever and a projection $j$ on the upper side of the valve E. The short arm $h$ of the lever is loop-shaped, as shown, in order to form a stop $k$, while the link I is pivotally connected at its lower end to the valve and at an intermediate point of its length to the stem $i$ on the lever and is provided above the latter point of connection with a portion $l$, adapted to bring up against the stop $k$ and the forward edge of the stem $i$ of the lever.

In virtue of the construction described in the foregoing it will be observed that when water is removed from the tank A the float H and the long arm $g$ of lever G will fall and the short arm $h$ of the lever, the link I, and the valve E will be raised to let water into the tank. In the latter position the link I will rest with its portion $l$ bearing against the stop $k$ of the lever, and hence the long arm of the lever and the float thereon will be prevented from dropping so low as to raise the valve E to an undue extent and lessen the liability of the valve properly seating on the subsequent upward movement of the float and the long arm of the lever. In other words, the link portion $l$, bringing up against the stop $k$ of the lever, will limit the upward movement of the valve and assure the same remaining in such position when opened that it will promptly and properly move down on the seat D when the long arm of the lever and the float are raised. It will also be observed that when the float and the long arm of the lever are raised to the full extent by water in the tank the valve E will be firmly forced down on the seat D, while the portion $l$ of the link will bring up and bear against the forward edge of the stem $i$ on the lever, with the result that the points of connection of the link to the valve and the lever will rest in a dead-center with the point of connection of the lever to the frame, thus locking the valve in its closed position and precluding upward movement thereof until the float and the long arm of the lever gravitate and break the dead-center.

Notwithstanding the advantages of our improved valve as pointed out in the foregoing it will be noticed that the construction is simple, compact, and inexpensive and embodies no delicate parts such as are likely to get out of order after a short period of use.

While we have shown our improved valve as arranged to automatically control the supply of water to a tank, we desire it understood that the valve may be used in any other connection to which it is applicable without involving a departure from the scope of our invention.

We have entered into a detailed description of the construction and relative arrangement of the parts embraced in the present and preferred embodiment of our invention in order to impart a full, clear, and exact understanding of the same. We do not desire, however, to be understood as confining ourselves to such specific construction and relative arrangement of parts, as such changes or modifications may be made in practice as fairly fall within the scope of our invention as claimed.

Having described our invention, what we claim, and desire to secure by Letters Patent, is—

1. In a valve, the combination of a frame $a$, valve-seat, a reciprocatory valve movable toward and from the seat, a lever fulcrumed at an intermediate point of its length on the frame, and having a stop on one of its arms, and also having a stem disposed between its fulcrum and the valve, and a link pivoted, at one end, to the valve, and, at an intermediate point of its length, to the stem of the lever, and having a portion movable between and adapted to bring up against the stop and the stem of the lever.

2. In a valve, the combination of a frame comprising a tubular portion, and standards extending therefrom, a valve-seat on said tubular portion of the frame, a reciprocatory valve movable toward and from the seat, a lever fulcrumed at an intermediate point of its length, between the standards of the frame, and having a stop $k$ on one of its arms, and also having a stem disposed between its fulcrum and the valve, and a link pivoted, at one end, to the valve, and, at an intermediate point of its length, to the stem of the lever, and having an upper portion movable between and adapted to bring up against the stop $k$ and the stem of the lever.

3. In a valve, the combination of a frame comprising an interiorly-threaded, tubular portion, and standards at one end thereof, an exteriorly-threaded valve-seat adjustable in the threaded portion of the frame, and carrying a central guide, a reciprocatory valve having a stem disposed in said guide, a lever fulcrumed at an intermediate point of its length, between the standards of the frame, and having a long arm and a short arm provided with a stop $k$, and also having a stem disposed between its fulcrum and the valve, a link pivoted, at one end, to the valve, and, at an intermediate point of its length, to the stem of the lever, and having a portion movable between and adapted to bring up against the stop $k$ and the stem of the lever, and a float on the long arm of the lever.

In testimony whereof we have hereunto set our hands in presence of two subscribing witnesses.

JOHN EDWARD KORDICK.
EDWARD SULGROVE.

Witnesses:
HENRY FOLLMANN,
G. C. HADDOCK.